Oct. 16, 1928.

H. E. PFEIFFER

1,687,691

SAUSAGE LINKING MACHINE

Filed April 16, 1924

Patented Oct. 16, 1928.

1,687,691

UNITED STATES PATENT OFFICE.

HERMANN E. PFEIFFER, OF CINCINNATI, OHIO.

SAUSAGE-LINKING MACHINE.

Application filed April 16, 1924. Serial No. 706,995.

In the manufacture of sausage, a casing, which is usually an intestinal gut or may be a manufactured article, has prepared sausage meat introduced into the same, the cased sausage being twisted in sections to produce linked sausage. The casing is usually tubular in form and of considerable length.

The object of my invention is to provide a rotary carrier and to associate therewith novel means whereby the cased sausage is pinched at intervals to form sections of cased sausage, and means whereby to rotate said sections for forming twists in the casing at such pinchings, in order to produce the linked sausage; further, to provide novel means for rotating the sausage sections; further, to provide novel means for producing the pinchings in the cased sausage; further, to provide novel means for holding a section of cased sausage adjacent to the section being rotated; further, to provide novel means whereby sequential operations are performed on the cased sausage in order to produce linked sausage; further, to provide novel means whereby alternate sections of the cased sausage are rotated, in order to produce twists between adjoining sections; further, to provide novel means whereby the rotation of the section takes place after the pinchings at the respective ends of the section and during freedom of said respective ends by the pinching agencies; further, to provide novel means whereby the pinchings are effected and subsequent to such pinchings the sausage section is rotated while in substantially suspended relation; further, to provide novel means whereby the linked sausage is suspended over a smoke-stick; further, to provide novel means for operating the carriage for the smoke-stick, and, further, to provide novel means whereby the forming of the cased sausage, the forming of the links therein, and the hanging of the linked sausage on smoke-sticks, may take place as a continuous operation.

The invention will be further readily understood from the following description and claims, and from the drawings, in which latter:

Fig. 14 is an axial section of the rotary carrier, taken on the line 14—14 of Fig. 10, showing the pinching mechanism.

Fig. 18 is a detail in cross-section, taken in the plane of the line 18—18 of Fig. 17, showing the means for yieldingly urging the operating disk for rotating the sausage section; and, Fig. 19 is a vertical section, taken on the irregular line 19—19 of Fig. 4, showing the means for moving the smoke-stick carriage lengthwise.

The machine comprises a suitable frame, including side-frames 21, 22, connected by tie-rods 23, and having a top 24, exemplified as including a pan 25, provided with a discharge spout 26. The filled sausage casing may be received over a suitable nozzle 28, controlled by a valve 29, in usual manner. The prepared sausage meat is filled into the casing by said nozzle, which is part of a suitable sausage stuffer, a portion of which is shown broken away at 30.

A rotary carrier 31 is mounted in the frame and has rotation imparted thereto in suitable manner, the rotary carrier being arranged for having the cased sausage received about its periphery from the spout 26.

The rotary carrier is fixed to a shaft 33, journaled in bearings 34, 35, in the side-frames, and in bearings 38, 39, at the inner ends of housings 40, 41, fixed to the side-frames, as by bolts 44, 45.

These housings are arranged to support suitable cams for operating devices moving with the rotary carrier in manner to be presently explained.

The means for rotating the shaft 33 are exemplified as an electric motor 46, the armature shaft of which is provided with a pinion 47, meshing with a gear 48, on a drive-shaft 49, journaled in bearings 50, 51, in the side-frames.

The gear 48 normally rotates loosely about the drive-shaft, and is held in endwise relation thereto, and is arranged to be operatively connected with the drive-shaft by means of a clutch 52, the clutch-collar 53 whereof has axial movement on the shaft and rotates with the shaft, by means of a spline groove and key connection 54, between said collar and said shaft. (See Figs. 1 and 9).

The clutch-collar is arranged to be moved axially by means of a fork 55, secured to a rock-shaft 56, journaled in bearings 57, secured to the motor frame. The shaft is provided with an arm 58, operated by means of a treadle 59, and a spring 60, the treadle being suitably pivoted at 61 to the motor-stand 62, and having a link 63 articulated therewith, the link being also articulated with the arm 58 (see Figs. 1 and 9). The spring is shown as normally causing engagement of the clutch for driving the machine.

Figures 6, 7, 8:
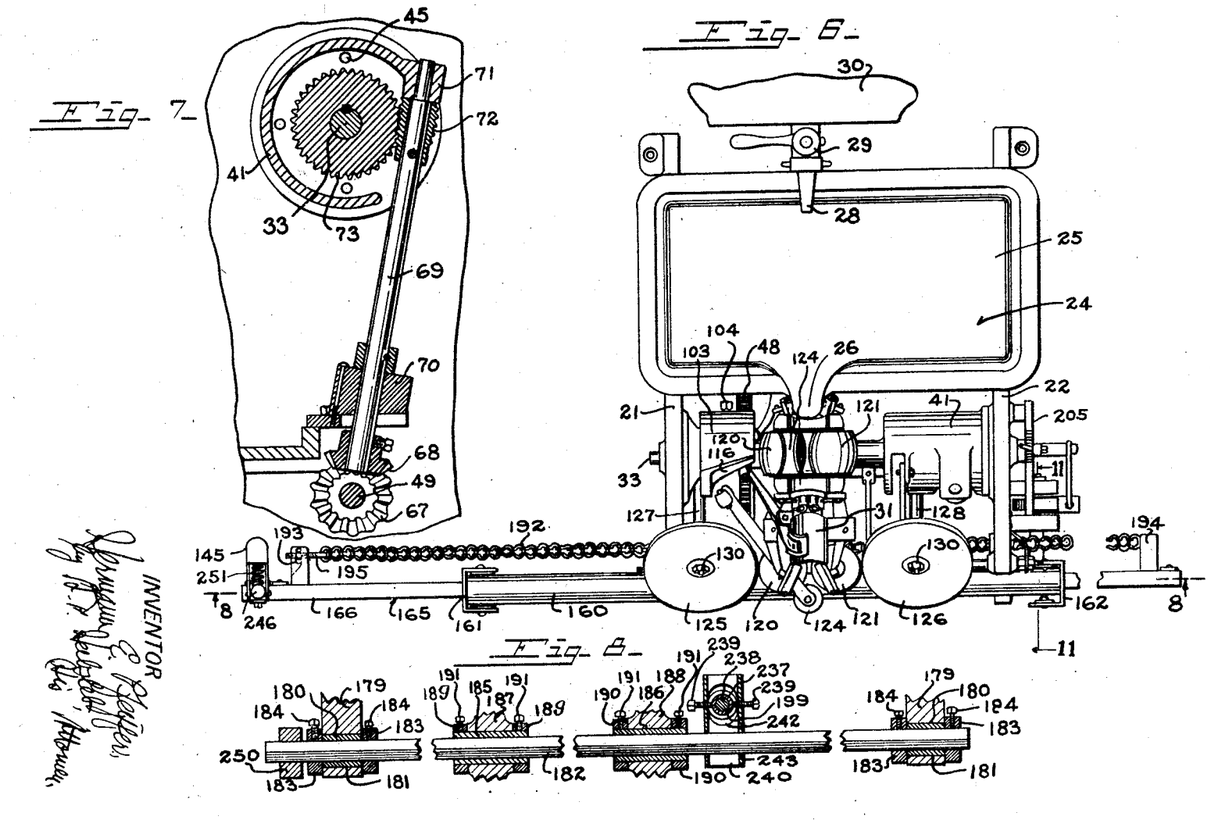
Fig. 6 is a plan view of my improved device, partly broken away.
Fig. 7 is a vertical section, taken on the line 7—7 of Fig. 1, showing the driving means for the rotary carrier.
Fig. 8 is a vertical section of the combined guide and clutch shifting rod, taken on the line 8—8 of Fig. 6.

The shaft 49 is provided with a bevel-pinion 67, meshing with the bevel-pinion 68, on a shaft 69, journaled in bearings 70, 71, and having a worm 72 fixed thereon, which meshes with a worm-wheel 73 fixed to the shaft 33 which has the rotary carrier fixed thereto. (See Figs. 1 and 7).

The rotary carrier has means mounted thereon for successively pinching the cased sausage at points spaced apart to form sausage sections, with means for holding a sausage section while an adjacent section is being rotated for forming the linked sausage, with means for rotating the sausage sections, and with means for supporting the cased sausage and its sections in positions for having the various means mentioned operate thereon.

In the present exemplification these various means are shown as rotating with the rotary carrier, suitable means being provided, exemplified as cam mechanisms, for causing the pinching, holding and rotating means to operate in sequence on the sausage.

The means for pinching the sausage are shown as operating on the cased sausage, at station A, and as releasing the sausage prior to the rotation of the section of the sausage thus divided for forming the sausage link, at station C, in order that the pinched portion of the cased sausage may be permitted to assume its twisted form for forming the link while free of abrasive contact with a pinching device.

In my improved device the pinching means squeezes upon the sides of the cased sausage and causes the sausage meat, between the contact portions which engage the casing, to shift into the sections of the cased sausage at the respective sides of the pinched portions, (see Fig. 2), so that only a pinched section of the cased sausage, from which the sausage meat has been exuded, need be twisted.

I have exemplified the pinching means as comprising pads 75 (see Figs. 2, 6 and 14), shown consisting of rubber strips 76, the ends of which are bent toward each other for forming a resilient yieldable squeezing face, having the curved portion of the bend thereof presented toward the sausage casing, so that, on contact of a mating pair of such squeezing cushions with the cased sausage, the sausage meat between such cushions will be caused to flow in both directions into the adjacent sections of the sausage.

Each of the squeezing cushions is shown fixed to a holder 77, arranged to rock on a pin 78, at the outer end of a lever 79, pivoted on a pin 80, received through said lever and into lugs 81 extending laterally from the rotary carrier, the lugs having a guiding slot 82 therebetween, for controlling the proper positioning of the pinching pads of the respective pairs of said pads.

Figures 12, 13:
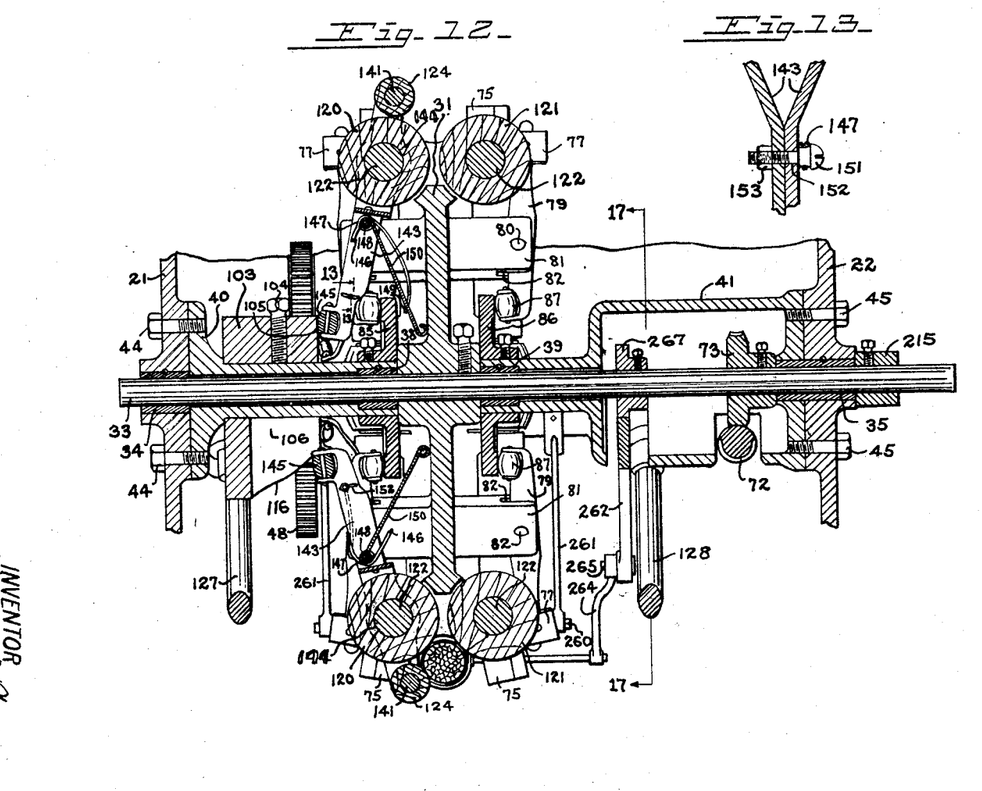
Fig. 12 is a horizontal section, taken on the line 12—12 of Fig. 1, and showing a section of sausage being rotated for forming the link.
Fig. 13 is a horizontal section of a detail of the rotating means, taken on the line 13—13 of Fig. 12.

The levers 79 are operated by opposing cams 83, 84, on cam-disks 85, 86, (see Figs. 12 and 14), stationarily secured to the housings 40, 41. The inner ends of the levers are provided with anti-friction rollers 87, for engaging the cams, and thereby operating the levers, for pressing the pads toward each other. The cams 83, 84, are represented as the high-points of said cam-disks for squeezing the cased sausage between the pads, (see upper portion of Figs 1 and 14), the pads being permitted to separate when the anti-friction rollers leave the high points (see the lower portion of Figs. 1 and 14).

The pads of the respective pairs of pads are preferably definitely separated prior to arrival at a position for receiving the sausage casing between them, by contact respectively with the respective under side surfaces 91 of the discharge spout 26 of the pan 25.

The rotary carrier is preferably provided with peripheral trough-sections 92, between pairs of pinching fingers, for supporting the section of sausage casing, and having holding means cooperate therewith at station B, for holding the sausage on such peripheral trough-section during the twisting of the sausage section at station C.

Figure 15:
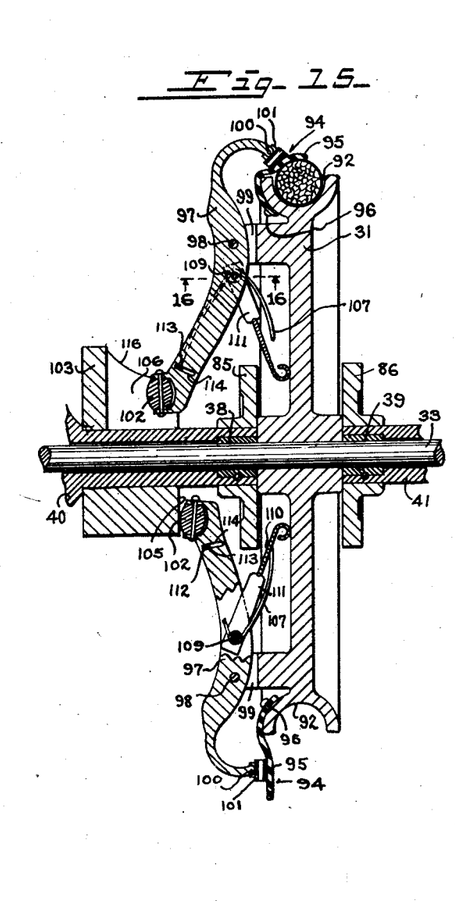
Fig. 15 is an axial section of the rotary carrier, taken on the line 15—15 of Fig. 10, showing the holding means for the sausage.

I have exemplified the holding means as a holder 94 comprising a rubber sheet 95 fixed to the rotary carrier at 96, the swinging end whereof is operated by a lever 97, pivoted by means of a pin 98, between lugs 99 extending from the side of the rotary carrier, the lever being guided in the slot between said lugs. The outer end of the lever is articulated at 100, with a backing-piece 101, secured to the holder. The inner end of each of the levers 97 is provided with an anti-friction roller 102 arranged to coact with a cam 103 fixed to the housing 40 by means of a bolt 104. The high point 105 of the cam is arranged to move the holder away from the sausage, (see the lower portion of Fig. 15) and preferably laterally out of range of the sausage being fed into and out of the peripheral groove of the rotary carrier.

Figure 10:
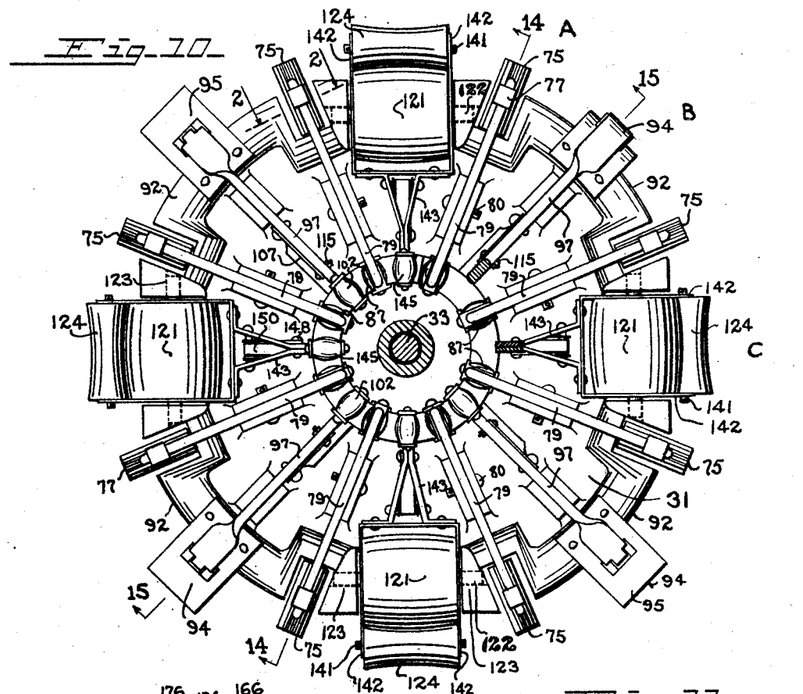
Fig. 10 is a vertical section, taken on the line 10—10 of Fig. 1, exemplifying the rotary carrier and the devices in association therewith.
Figure 11:
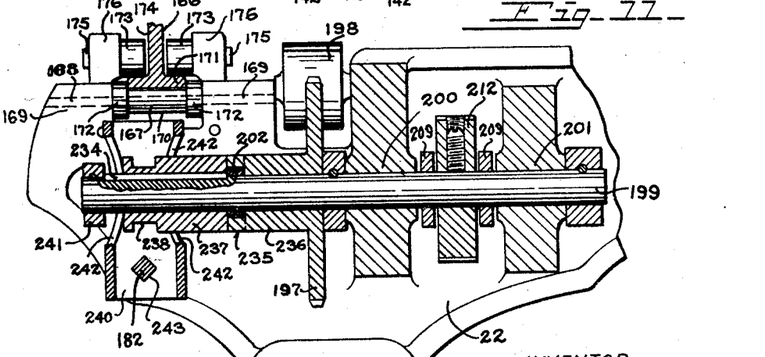
Fig. 11 is a vertical section, taken on the line 11—11 of Fig. 6, showing the actuating means for the carriage supporting the smoke-stick.
Figure 16:
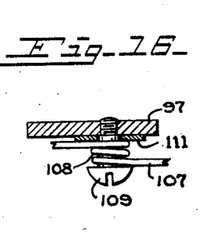
Fig. 16 is a sectional view of a detail of the holding means, taken on the line 16—16 of Fig. 15.

The holder is normally urged toward the periphery of the rotary carrier by means of a spring 107 (see Figs. 10, 15 and 16), provided with a coil 108 received about a pin 109 secured to the lever 97, one end of the spring being provided with a hook 110 received under an arm 111, pivoted about said pin and bearing against the rotary carrier. The other end of the spring is provided with a coil 112 received about a bolt 113 extending through a slot 114 in the lever 97, a nut 115 securing the bolt in adjusted positions in said slot for adjusting the tension of the spring.

Figure 9:
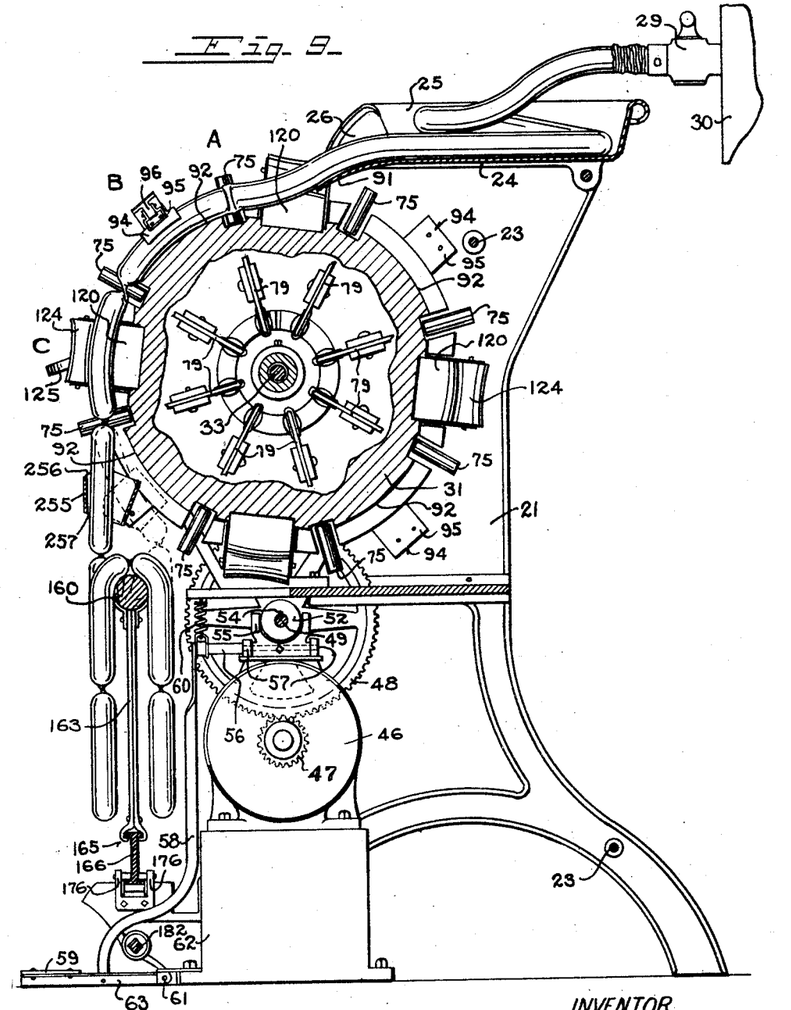
Fig. 9 is a vertical section of my improved device, taken on the irregular line 9—9 of Fig. 1, showing the sausage successively pinched, twisted and suspended on a smoke-stick, and showing the rotary carrier partly in side elevation.

It will be understood that the rotary carrier preferably has continuous rotary motion imparted thereto, and that it carries with it on its periphery the cased sausage which is being fed from the pan (see Fig. 9).

The section of cased sausage which has thus been formed and which is in advance of the one which is being held, is rotated about its axis for forming the pinched section into twisted form, this rotation taking place preferably while the section is in downward position (at station C) for aiding in ease of rotation of the same, (see Fig. 9).

The rotating means for the sausage section are exemplified as a pair of rollers 120, 121. Each of the rollers rotates freely on a shaft 122 located in bearings 123 in the carrier. These rollers are preferably convex or rounded on their peripheries so as to form a trough therebetween of the general form of the periphery of the rotary carrier, in which the sausage is arranged to be received. These rollers are arranged in pairs about the periphery of the rotary carrier. Each pair of rollers preferably has an outer roller 124 coacting therewith, which is arranged to bear upon the outer portion of the sausage section being rotated, as exemplified in the lower portion of Fig. 12. The outer roller preferably has a concave periphery to match the convex peripheries of the inner pair of rollers.

The pair of rollers are exemplified as rotated by means of rotating disks 125, 126, so positioned as to contact the outer lateral portions of the peripheries of said rollers when the sausage section is located between them, for instance, in the position shown at station C in Fig. 9. The amount of rotation imparted to the sausage section is preferably regulated by the length of contact relation between the disks and the rollers. The disks are preferably fiber disks arranged to rotate the rollers by frictional contact therewith.

The disks are secured to shafts 127, 128, as by being respectively received between a shoulder 129, on said shaft, and a nut 130 threaded about the outer end of the shaft. Each of said shafts is journaled in a lower bearing 131, which is pivoted, as by a pivot-pin 132, to the main frame, so as to provide lateral adjustment for the upper end of said shaft and consequent length of driving contact with the roller.

The lower end of the shaft is provided with a bevel-pinion 133 which is meshed by a bevel-pinion 134, on the drive-shaft 49. The upper end of the shaft rotates in a bearing 135, pivoted in a yoke 136, having a threaded rod 137 extending therefrom. The threaded rod has axial movement in a bearing 138 in the frame. A spring 139 normally urges the rod in its bearing toward the rotary carrier. The inward limit of movement of the rod is regulated by a nut 140, adjusted about the threaded end of the rod, and arranged to strike the bearing 138 in the frame. Adjustment of the nut permits rotating contact between the disk and the periphery of the roller, throughout the desired portion in length of the roller, for the desired amount of rotation of the sausage section being twisted. The disk may be adjusted to, for instance, contact only the thickest portion of the roller, or a greater portion in length of the roller, as may be desired.

The pairs of rollers and the peripheral supporting trough 92 alternate in positions between pairs of pinching means, and the parts are so arranged that alternate sections are rotated for twisting the links, the section in rear of the one being rotated being held in the peripheral trough. In this manner every other sausage section is rotated, while the alternate sausage sections are held during the twisting operation.

While the sausage section is being rotated by the rollers 120, 121, it is also preferably held toward said rollers by the roller 124. The roller 124 is mounted on a shaft 141 having bearing in the upper ends of tines 142 of a forked lever 143, the tines of the fork being pivoted on bearings 144 about the shaft 122 of the roller 120. The inner end of this lever is acted on by the cam 103 and carries a roller 145 which rides on the cam. The high part 105 of which normally retracts the roller 124, the roller 124 being normally urged toward the line of the sausage by a spring 146 having a coil 147 about a pin 148 held between the tines of the forked lever. One end of the spring is provided with a hook 149 engaging an arm 150 pivoted about said pin at one end, and contacting the web of the rotary carrier at its other end. The other end of the spring is coiled about an adjusting screw 151 adjustable in a slot 152 in said lever and secured in adjusted positions by a nut 153. The spring urges the roller 124 to hold the sausage section in close relation to the rollers 120, 121, when the rotary carrier is so positioned about its axis that the disks 125, 126, contact the rollers 120, 121, for rotating the latter, and thereby rotating the sausage section between said rollers for linking the respective ends thereof. When in this position the cam end of the lever is received in the recess 106 of the cam 103. As soon as the twisting of the sausage has been accomplished the roller 124 is retracted by having the inner end of its lever ride upon the incline 116 toward the high part of the cam, so that the sausage section may depend from the rotary carrier free of the rollers for being delivered from the carrier.

This delivering is preferably effected upon a smoke-stick 160, releasably received in sockets 161, 162, on uprights 163, 164, of a carriage 165, shown as comprising a beam 166, mounted on rollers 167, supported on shafts 168, in bearings 169, at the forward portions of the side-frames. The roller 167 is shown as having a peripheral recess 170 in which the lower flange 171 of the beam is received, the roller having shoulders 172 at the respective ends of said recess for guiding the respective outer edges of said flange. A roller 173 is received over said flange at each side of the web 174 of the beam for holding the beam downwardly against the roller 167, the rollers 173 being on pins 175 located in brackets 176 secured to the respective side-frames of the machine.

The carriage includes hangers 179, depending from the beam, and having bearings 180 at their lower ends, in which bushings 181 rock. The bushings being held in endwise relation in said bearings. A steadying rod 182 also serving as a rocker-rod, is located in said bushings, and held in endwise relation therein, as by collars 183 secured to said rod by set-bolts 184, the collars holding the rod and the bushings endwise in said bearings. This rod is shown as a square rod.

The steadying rod steadies the smoke-stick carriage in upright relation and is slidable lengthwise in bushings 185, 186, in bearings 187, 188, at the forward ends of the side-frames, collars 189, 190, being fixed to said bushings by set-bolts 191, for holding said bushings in said bearings.

A sprocket-chain 192 is fixed at its respective ends to brackets 193, 194, at the respective ends of the carriage, as by fastenings 195, 196, the fastening 195 being preferably adjustable. The sprocket-chain is received about a sprocket-wheel 197, being held thereon by an idler wheel 198 on the side-frame 22. The sprocket-wheel 197 is located on a shaft 199, journaled in bearings 200, 201, located in lugs extending from the side-frame 22. The sprocket-wheel is normally loose on said shaft, being held in endwise relation thereon toward the bearing 200 by a collar 202 fixed to said shaft.

Means are provided for operating such sprocket-wheel for feeding the smoke-stick carriage in accordance with the delivery of linked sausage from the rotary carrier and for lapping the sausage upon the smoke-stick.

The movement of the smoke-stick carriage is imparted by an arm 205, pivoted to the side-frame 22 on a pivot-screw 206. A link 207 is articulated with the arm at 208 and with a lever 209 at 210, the lever 209 being pivoted about the shaft 199. A pawl 211 is pivoted to the arm, and engages the teeth of a ratchet-wheel 212, fixed to said shaft, being normally urged into engagement with said teeth by a spring 213. A cam 215 is fixed to the shaft 33, to which the rotary carrier is fixed, and in the form shown is arranged to operate the arm 205 twice for each revolution of the rotary carrier.

Adjustment is provided for adjusting the distance of lengthwise movement of the smoke-stick carriage at each operation of the ratchet-wheel, for which purpose the articulation 208 is shown as comprising a pivot-piece 217 fixed to a block 218, which is an extension of an adjusting handle 219, pivoted to the arm 205 by a bolt 220. The block 218 has a pin 221 thereon which operates in a bore 222 in the arm 219.

A latch-lever 225 is pivoted to the upper end of the handle, and has a tooth 226 arranged to engage the teeth of a rack 227, on the arm 205, for shifting the articulation 208 toward and from the pivot of the arm 205, and thereby adjusting the extent of movement of said articulation at each actuation of the arm 205. In order to further position the handle, a bolt 228 extends through a slot 229 in the arm 205 and a hole 230 in the block and is threaded into the pivot-piece, for clamping the pivot-piece and block in adjusted position. A bolt 231 and washer 232 hold the link 207 to the pivot-piece.

The intermittent movement of the ratchet-wheel is transmitted to the sprocket-wheel 197 by means of a clutch 235, so that the smoke-stick carriage may be placed under the influence of the intermittent feed, in order to automatically arrange the linked sausage on the smoke-stick, or to release the smoke-stick carriage from its automatic feed, and permit the same to be moved lengthwise in either direction quickly by hand.

The clutch is exemplified as a tooth-clutch, the teeth of which are respectively on the hub 236 of the sprocket-wheel and on a clutch-collar 237, movable lengthwise on the shaft 199 by means of a spline groove and key connection 234 and provided with an annular groove 238 in which the end of bolts 239 are received, the bolts being threaded into an arm 240. A collar 241 at the outer end of the shaft 199 maintains the clutch-collar on said shaft. The arm 240 is shown tubular, and has recesses 242 in which the clutch-collar is located, the side walls of the recesses being guided on the clutch-collar. The arm is provided with square holes 243 through which the square rocker-rod 182 extends, the rocking of the rod rocking the arm and engaging or disengaging the clutch.

The rocker-rod 182 is rocked by means of a handle 245, pivoted to an upright 246, fixed to the smoke-stick carriage. The handle has a link 247, articulated therewith at 248, at one end of the link, the other end of the link being articulated at 249 with an arm 250, fixed to said rocker-rod. A spring 251 between the upright and the handle normally urges the clutch into engaged relation.

Figures 1, 2, 3:
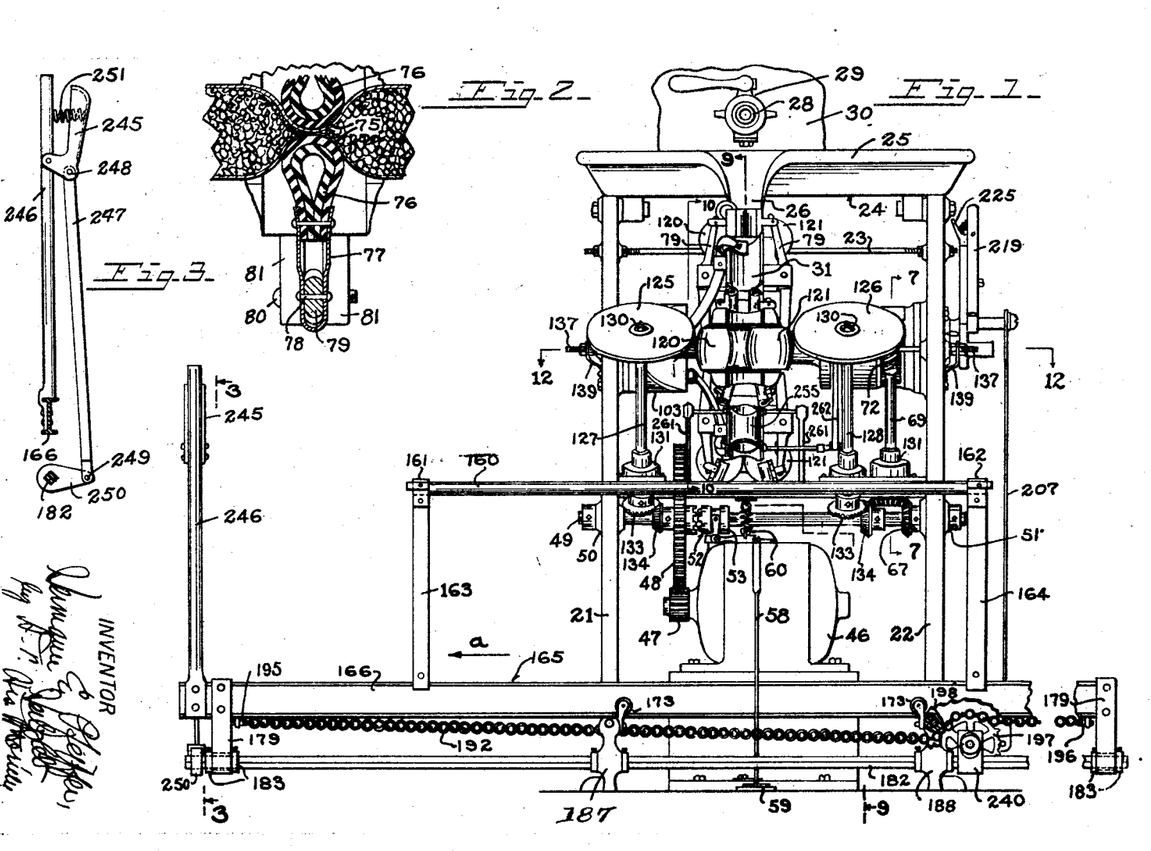
Fig. 1 is a front elevation of my improved device, partly broken away.
Fig. 2 is a sectional view of a detail taken on the line 2—2 of Fig. 10, showing the pinching pads pinching a cased sausage between them.
Fig. 3 is a vertical section of the clutch control taken on the line 3—3 of Fig. 1.

The automatic feed of the smoke-stick carriage is effected in the direction of the arrow A, shown in Fig. 1, and automatically moves the smoke-stick carriage so that the linked sausage being fed from the rotary carrier may be lapped over the smoke-stick, and so that one strand of the linked sausage on the smoke-stick may have been fed past the position of delivery of the linked sausage when the next strand of linked sausage is ready to be laid over the smoke-stick. When the smoke-stick has been filled, or sufficient sausage hung thereon, the smoke-stick is removed, and another smoke-stick placed on the carriage, the clutch released, and the smoke-stick carriage moved by hand quickly in a direction opposite to the direction of the arrow A in Fig. 1, to again place the smoke-stick carriage in initial position for having the substitute smoke-stick thereon hung with the sausage.

Figures 4, 5:
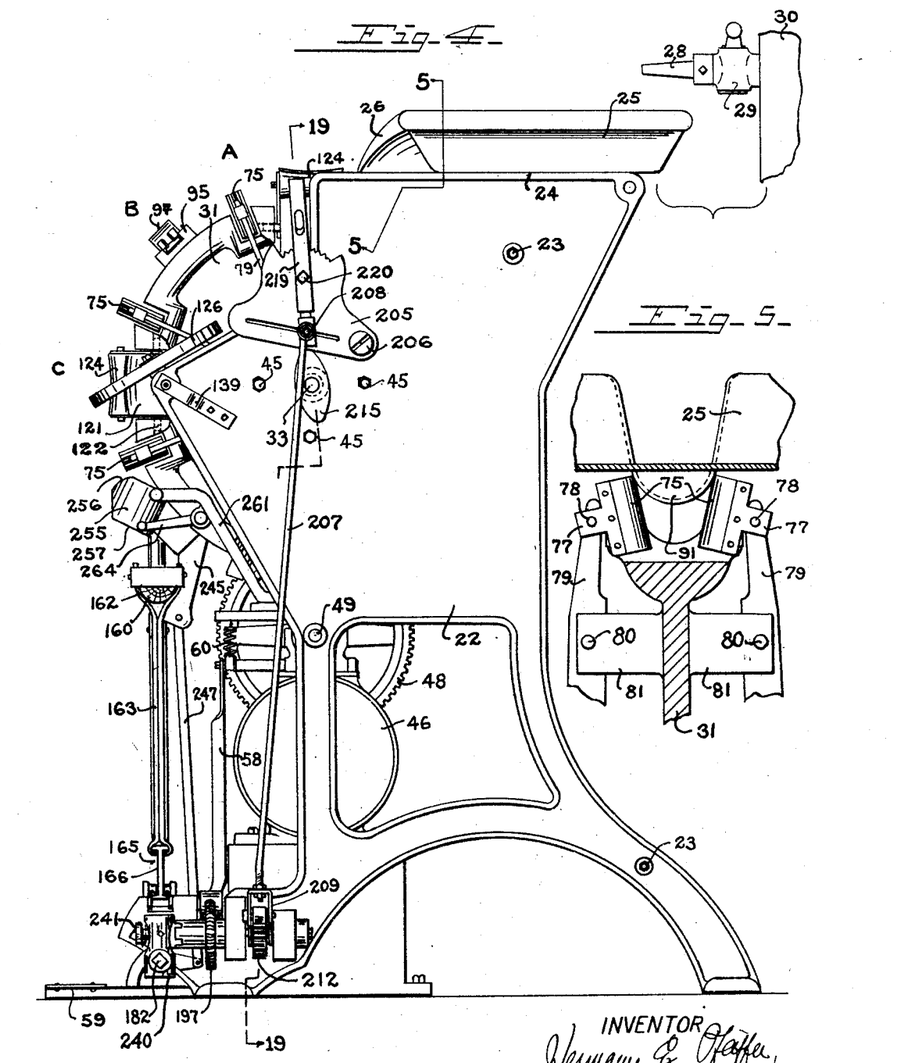
Fig. 4 is a side elevation of my improved device.
Fig. 5 is a vertical section of a detail taken on the line 5—5 of Fig. 4, and showing the relation of the feeding spout of the trough to the rotary carrier.

Means are provided for moving the linked sausage alternately to one side and the other of the smoke-stick for looping the linked sausage upon the smoke-stick. This is shown accomplished by providing a guide 255, shown as a tubular guide, having a wide mouth 256 and an outlet 257 of smaller diameter. This guide is located in a position below the station C, at which the sausage section is rotated, see Figs. 4, 9 and 17, and from which the linked sausage depends.

The position of this guide is shifted automatically for arranging the linked sausage loopwise at the respective sides of the smoke-stick. Thus the tubular guide is pivoted by a pivot 260 on an arm 261 extending from the frame, for permitting the swinging of the tubular guide. This swinging of the tubular guide is controlled by an arm 262, pivoted to the housing 41 at 263, and having a link 264 articulated therewith at 265, the link 264 being articulated with the tubular guide at 266. The shaft 33 is provided with a cam 267 in the housing 41, the cam coacting with a finger 268 on the arm 262 for swinging the arm and consequently the tubular guide. The arm and tubular guide are normally retracted by a spring 269, the respective ends of which are fixed to said arm and said housing. One-half of the links of sausage are guided to each side of the stick.

Figure 17:
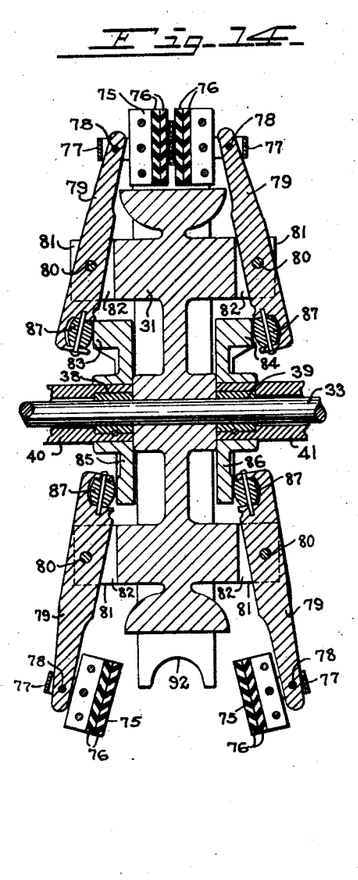
Fig. 17 is a vertical cross-section, taken on the line 17—17 of Fig. 12, partly broken away, and showing the means for arranging the linked sausage at one side on the smoke-stick, in full lines and on the other side in dotted lines.
Figures 17, 18, 19:
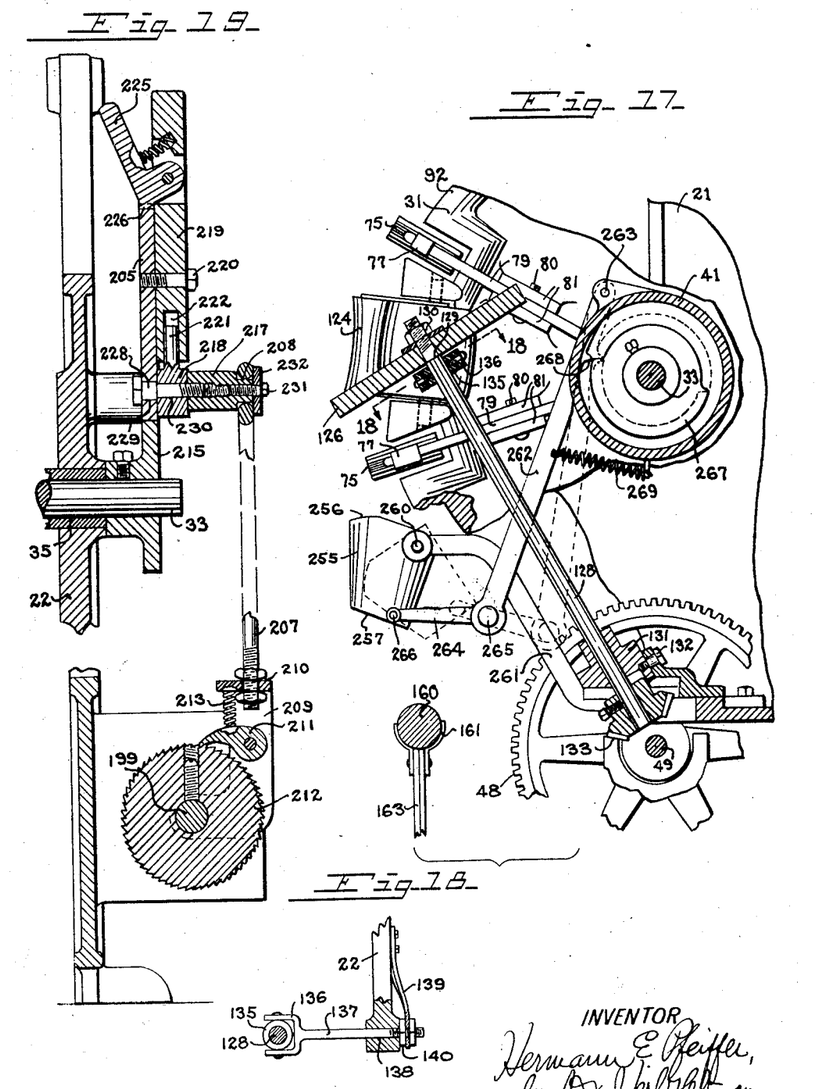

As exemplified, the rotary carrier is provided with four positions, at which rotation of the sausage link takes place, and with four positions at which alternate sausage sections are held, making eight sausage positions in the circumference of the rotary carrier, and eight sausage links for each rotation of the rotary carrier, four of which are draped loopwise at one side of the smoke-stick and four of which are draped loopwise at the other side of the smoke-stick, the cam 267 being fixed to the shaft 33 on which the rotary carrier is fixed, one-half of the cam moving the arm 262 to shift the tubular guide toward one side of the smoked stick, as shown in full lines in Fig. 17, the other half of the cam permitting retraction of said arm for shifting the tubular guide to the other side of the smoke-stick, as shown in dotted lines in Fig. 17.

Having thus fully described my invention, what I claim as new, and desire to secure by Letters Patent, is:

1. In a sausage linking machine, the combination of a rotary carrier, pinching means for the cased sausage arranged in pairs about said rotary carrier, holding means for holding the cased sausage upon said carrier arranged about said carrier between alternate adjacent pairs of said pinching means, and rotating means for rotating pinched sections of said cased sausage located between alternate adjacent pairs of said pinching means, said holding means and said rotating means alternating about said rotary carrier between adjacent pairs of pinching means, and means for rotating said carrier, said pinching means, said holding means and said rotating means in unison about the axis of rotation of said carrier.

2. In a sausage linking machine, the combination of a rotary carrier having a substantially horizontal axis of rotation, pinching means for pinching the cased sausage into sections, rotating means for rotating said sections, means for rotating said rotary carrier, said pinching means and said rotating means in unison about said axis, means for operating said pinching means for pinching and releasing said cased sausage, and means for rotating said rotating means for rotating said section of cased sausage pinched after release of said pinching means therefrom.

3. In a sausage linking machine, the combination of a rotary carrier having a substantially horizontal axis of rotation and having a periphery arranged to receive cased sausage, pinching means acting on the cased sausage from the respective sides of said carrier, and a pan having a delivery spout for delivery of cased sausage to said periphery and arranged for separating said pinching means.

4. In a sausage linking machine, the combination of a rotary carrier having a substantially horizontal axis of rotation, pinching means for a cased sausage for pinching said casing into sections and comprising levers pivoted in substantial radial positions to said carrier, rolling means for said sections comprising a roller and a lever therefor pivoted in substantial radial position to said carrier, and cam means at the inner ends of said levers for operating the same.

5. In a sausage linking machine, the combination of a rotary carrier having a substantially horizontal axis of rotation, rotating means thereon for sections of sausage casing, said rotating means comprising a rounded roller, and a driven disk arranged to be engaged by the peripheral face of said rounded roller for rotating said rotating means.

6. In a sausage linking machine, the combination of a rotary carrier having a substantially horizontal axis of rotation, rotating means thereon for sections of sausage casing, said rotating means comprising a rounded roller, a driven disk arranged to be engaged by the peripheral face of said rounded roller for rotating said rotating means and means for resiliently moving said driven disk into the path of said roller.

7. In a sausage linking machine, the combination of a rotary carrier having a substantially horizontal axis of rotation, rotating means thereon for sections of sausage casing, said rotating means comprising a rounded roller, a driven disk arranged to be engaged by the peripheral face of said rounded roller for rotating said rotating means, means for resiliently moving said driven disk into the path of said roller, and means for limiting the movement of said driven disk toward said roller.

8. In a sausage linking machine, the combination of a rotary carrier having a substantially horizontal axis of rotation and a periphery for receiving a cased sausage, a pair of rounded rollers respectively at the respective sides of the position of the sausage and having axes of rotation extending in the general direction of the length of said sausage, the adjacent portions of said rollers forming a receiving recess for the sausage and the outer lateral portions of said rollers forming rounded bulges, and driven disks whose edges are arranged to be contacted by said bulges for rotating said rollers.

9. In a sausage linking machine, the combination of a rotary carrier having a substantially horizontal axis of rotation and a periphery for receiving a cased sausage, a pair of rounded rollers respectively at the respective sides of the position of the sausage and having axes of rotation extending in the general direction of the length of said sausage, the adjacent portions of said rollers forming a receiving recess for the sausage and the outer lateral portions of said rollers forming rounded bulges, driven disks whose edges are arranged to be contacted by said bulges for rotating said rollers, a supplemental roller, and means for positioning said supplemental roller toward said receiving recess during coaction of said driven disks with said pair of rollers.

10. In a sausage linking machine, the combination of a rotary carrier having a substantially horizontal axis of rotation, and pinching means for a cased sausage mounted for rotation with said carrier, said pinching means comprising a resilient pad, a support for said pad, an arm on which said support is pivotally mounted, and means for operating said arm.

11. In a sausage linking machine, the combination of a rotary carrier having a substantially horizontal axis of rotation, and pinching means for a cased sausage comprising a pair of opposed resilient pads, levers pivoted to the respective sides of said carrier, said pads having attachments with the outer ends of said levers, and cam means at the inner ends of said levers for operating the same.

12. In a sausage linking machine, the combination of a rotary carrier having a substantially horizontal axis of rotation, said carrier provided with a peripheral trough section for supporting cased sausage, and a holder for said cased sausage comprising a flexible sheet attached to the side trough-section, and means for laying said flexible sheet opposite said trough-section for holding a cased sausage between said flexible sheet and said trough-section.

13. In a sausage linking machine, the combination of a rotary carrier having a substantially horizontal axis of rotation, said carrier provided with a peripheral trough-section for supporting a cased sausage, and a holder for said cased sausage comprising a sheet, a lever pivoted to said carrier and articulated with said sheet, and cam means for operating said lever, for laying said sheet opposite said trough-section for holding a cased sausage between said sheet and said trough-section.

14. In a sausage linking machine, the combination of a rotary carrier having a substantially horizontal axis of rotation and provided with peripheral trough-sections spaced apart bp peripheral spaces, and pinching means and rollers for pinched sausage sections located in said peripheral spaces, said trough-sections and said rollers arranged to support the sausage and provided with sausage supporting faces of arcuate forms in the directions of extension of the sausage.

15. In a sausage linking machine, the combination of a rotary carrier for receiving a cased sausage on its periphery, pinching means pivoted to said carrier in pairs, stationary cams to operate said last-named means to pinch said cased sausage into sections at predetermined intervals, means to twist said pinched sections into links, said last-named means contacting alternate sections, means to hold intermediate sections while a prior section is being twisted, means to suspend said linked sausage over a smoke-stick and means to feed said smoke-stick longitudinally.

16. In a sausage linking machine, the combination of a rotary carrier, means for twisting a cased sausage into linked sausage, means for arranging the linked sausage on a smoke-stick comprising a shifter for directing the linked sausage laterally to the respective sides of the smoke-stick, an arm, a pivot between the upper end of said shifter and said arm, a pivoted arm, a link connecting the lower end of said pivoted arm with the lower end of said shifter, said arm arranged in crossing relation, and a cam rotating with said carrier for operating said pivoted arm.

17. In a sausage linking machine, the combination with a rotary carrier and means for twisting a cased sausage into linked sausage, of a smoke-stick carriage, and means for feeding said carriage longitudinally crosswise of said rotary carrier comprising a rachet-wheel and pawl forming a pair of feeding members, a lever, a cam for operating said lever, a link having articulation with said lever and articulation with one of said members, and means for adjusting the distance between said first-named articulation and the pivot of said lever.

18. In a sausage linking machine, the combination with a rotary carrier and means for twisting a cased sausage into linked sausage, of a smoke-stick carriage, and means for feeding said carriage longitudinally crosswise of said rotary carrier comprising a rachet-wheel and pawl forming a pair of feeding members, a lever, a cam for operating said lever, a link having operative connection with one of said members, a handle on said lever, a latch between said handle and said lever, and an articulating connection between said handle and said link.

19. In a sausage linking machine, the combination with a rotary carrier and means for twisting a cased sausage into linked sausage, of a smoke-stick carriage, and means for feeding said carriage longitudinally crosswise of said rotary carrier comprising a ratchet-wheel and pawl forming a pair of feeding members, a lever, a cam for operating said lever, a link having operative connection with one of said members, said lever provided with a slot, a block adjustable in said slot, an articulating connection between said link and said block, a handle, an extensible operative connection between said handle and said block arranged for adjusting said block lengthwise of said slot, and a latch for adjustably positioning said handle on said lever.

20. In a sausage linking machine, the combination with a rotary carrier and means for twisting a cased sausage into linked sausage, of a smoke-stick carriage, means for feeding said carriage longitudinally crosswise of said rotary carrier including a clutch at one end of said carriage, and means for releasing said clutch comprising a handle at the other end of said carriage.

21. In a sausage linking machine, the combination with a rotary carrier and means for twisting a cased sausage into linked sausage, of a smoke-stick carriage, means for feeding said smoke-stick carriage longitudinally crosswise of said rotary carrier, and means for guiding said smoke-stick carriage comprising a beam having a flange at each side thereof, rollers below and above said flanges, hangers depending from said beam, a rod below said beam and having connections with said hangers, and bearing means for said rod and said rollers.

22. In a sausage linking machine, the combination of a rotary carrier, means rotatable therewith for twisting a cased sausage into linked sausage, a smoke-stick carriage, means including a clutch for feeding said carriage crosswise of said carrier, and a rocker-rod forming a guide for said carriage and operating means for said clutch.

23. In a sausage linking machine, the combination with a rotary carrier and means for twisting a cased sausage, into linked sausage, of a smoke-stick carriage, means for feeding said smoke-stick carriage longitudinally crosswise of said rotary carrier comprising a clutch, means for guiding said smoke-stick carriage comprising a guide, a guide rod having connection therewith, means for rocking said guide rod and operative connection between said guide rod and said clutch for operating said clutch.

In testimony whereof, I have hereunto signed my name.

HERMANN E. PFEIFFER.